United States Patent [19]

Salisbury

[11] 4,390,495
[45] Jun. 28, 1983

[54] CONTROL OF COLLIDING ION BEAMS

[75] Inventor: Winfield W. Salisbury, Scottsdale, Ariz.

[73] Assignee: Energy Profiles, Inc., Newtown Square, Pa.

[21] Appl. No.: 226,453

[22] Filed: Jan. 19, 1981

[51] Int. Cl.³ .............................................. G21B 1/00
[52] U.S. Cl. .................................................. 376/120
[58] Field of Search ........................ 376/107, 127–129, 376/120, 139, 144; 250/251, 423 R; 313/359.1, 362.1, 363.1; 315/111.41, 111.61

[56] References Cited

U.S. PATENT DOCUMENTS

| | | | |
|---|---|---|---|
| 2,997,436 | 8/1961 | Little et al. | 176/6 |
| 3,005,767 | 10/1961 | Boyer et al. | 176/5 |
| 3,039,014 | 6/1962 | Chang | 376/107 |
| 3,096,269 | 7/1963 | Halbach et al. | 376/107 |
| 3,101,310 | 8/1963 | Post | 376/128 |
| 3,117,912 | 1/1964 | Imhoff et al. | 176/6 |
| 3,132,996 | 5/1964 | Baker et al. | 176/6 |
| 3,166,477 | 1/1965 | Leboutet | 376/128 |
| 3,189,523 | 6/1965 | Patrick | 376/141 |
| 3,238,413 | 3/1966 | Thom et al. | 315/111.61 |
| 3,274,435 | 9/1966 | Kerst | 376/120 |
| 3,321,664 | 5/1967 | Phillips et al. | 176/3 |
| 3,418,206 | 12/1968 | Hall et al. | 176/2 |
| 3,445,333 | 5/1969 | Lecomte | 376/107 |
| 3,462,622 | 8/1969 | Cann et al. | 310/11 |
| 3,501,376 | 3/1970 | Dow et al. | 176/1 |
| 3,527,977 | 9/1970 | Ruark | 376/141 |
| 3,533,910 | 10/1970 | Hirsch | 176/1 |
| 3,571,642 | 3/1971 | Westcott | 376/129 |
| 3,579,028 | 5/1971 | Parne | 315/111.21 |
| 3,663,858 | 5/1972 | Lisitano | 315/39 |
| 3,733,248 | 5/1973 | Hendel et al. | 176/3 |
| 3,859,164 | 1/1975 | Nowak | 176/5 |
| 4,189,346 | 2/1980 | Jarnagin | 176/5 |
| 4,202,725 | 5/1980 | Jarnagin | 176/5 |

FOREIGN PATENT DOCUMENTS

| | | | |
|---|---|---|---|
| 2346819 | 3/1975 | Fed. Rep. of Germany | 176/2 |
| 873057 | 7/1961 | United Kingdom | 176/3 |
| 1012751 | 12/1965 | United Kingdom | 176/2 |

OTHER PUBLICATIONS

IEEE Trans. on Nuclear Science, vol. NS-22, No. 3, 6/75, pp. 1790–1793, Maglich et al.
"Controlled Thermonuclear Reactions", published by D. Van Nostrand Co. Inc., Princeton, N.J., Glasstone et al., pp. 67, 68, 77, 78.
IBM-Technical Disclosure Bulletin, vol. 18, No. 6, 12/75, pp. 2031, 2033.
ANS Trans., vol. 27, 11/27-12/2/77, p. 63, Woodall.
Soviet Physics, vol. 17, No. 10, Apr. 1972, Yu. P. Ladikov and Yu. I. Samoilenko, pp. 1644–1650.

Primary Examiner—Harvey E. Behrend
Attorney, Agent, or Firm—Richards, Harris & Medlock

[57] ABSTRACT

A fusion reaction system is provided wherein ions from two sources are forced by passage through magnetic and electric fields to travel toward each other in opposite senses and directions under confinement to common helical paths at a common radius in a cylindrical reaction zone by radial electric fields. The ions are bunched along said helical paths to establish a plurality of concentrations of the ions located at spaced points along the paths with the points being the same for ions from both sources. Structure in the reaction zone is arranged for establishing local variations in the radial electric fields to produce the localized concentrations of ions as they traverse their helical paths. Further, means may be provided to velocity modulate the ion sources for producing standing waves along the reaction paths having velocity nodes located at points in the reaction zone where the localized concentrations occur. Variable voltage sources are connected to modulate the velocities of ions from the two sources for producing standing waves in the reaction zone having velocity nodes spaced the same as the spacing between the localized concentrations. Phase adjustment means provide for positioning the velocity nodes at the same points as the points at which the localized concentrations occur.

20 Claims, 3 Drawing Figures

CONTROL OF COLLIDING ION BEAMS

TECHNICAL FIELD

This invention relates to a method and system for enhancing the power producing capability of a nuclear fusion reactor and more specifically to methods and structure for enhancing the ion density in a directed particle fusion reactor.

BACKGROUND ART

In applicant's U.S. application Ser. No. 201,544 which is a division of application Ser. No. 21,115, now abandoned, an atomic fusion process and systems are disclosed wherein two oppositely directed steams of ions are forced to follow the same helical paths in a cylindrical reaction zone for promoting fusion producing collisions between particles of one stream and particles of the other stream. As one of several examples, one stream may comprise deuterium and the other stream, helium 3 ions.

The reaction zone comprises an annulus between an inner cylindrical electrode and an outer cylindrical electrode. A radial electric field is established in the annulus to control and maintain the streams in the helical paths.

Where two such beams of positively charged particles move in opposite directions along such paths, a high ion density is desired in order to be able to promote collisions sufficient to produce a net power gain from the system. The present invention is directed to the creation of conditions in a reactor such that desired high ion densities are periodically achieved.

DISCLOSURE OF THE INVENTION

In accordance with the invention, oppositely directed ion beams constrained to helical paths pass through a cylindrical reaction zone. The object is to produce fusion reactions due to collisions between the ion beams. The reaction zone is an annulus between an inner-cylindrical electrode and an outer-cylindrical electrode.

The beams are enhanced in ion density at spaced points along the paths by providing spline structures extending the length of the reaction zone and protruding from the walls of the electrodes into the reaction zone. The splines preferably extend along the outer surface of the inner electrode. Splines also may be provided on the inner surface of the outer electrode. This structure causes variations in the electric field along the helical paths followed by the ion beams. Such fields cause the beams to be successively more concentrated and less concentrated as the beams traverse the reaction zone. Points of high concentration are the points at which fusion-producing collisions most likely take place.

Variations in the reaction chamber dimensions improves the ratio of energy output to energy input by enhancing the charge density and beam stability and reduces the tendency toward coulomb scattering.

Thus there is provided improvement in a fusion reaction system wherein ions from two sources are forced to follow helical paths in opposite senses in a cylindrical reaction zone. Structure on at least one of the boundaries of the reaction zone aid in ion density enhancement.

Further, in accordance with the present invention, ion density is further enhanced by modulating the velocity of the ions from the two opposed sources such that waves traveling through the reaction zone in opposite directions create standing waves wherein the wave length corresponds to the distance between points of concentration of the fields due to the presence of the splines. The waves are of such phase that the velocity nodes occur at the points of the high ion density due to the variations in reaction chamber dimensions.

DETAILED DESCRIPTION

FIG. 1

Figure 1:
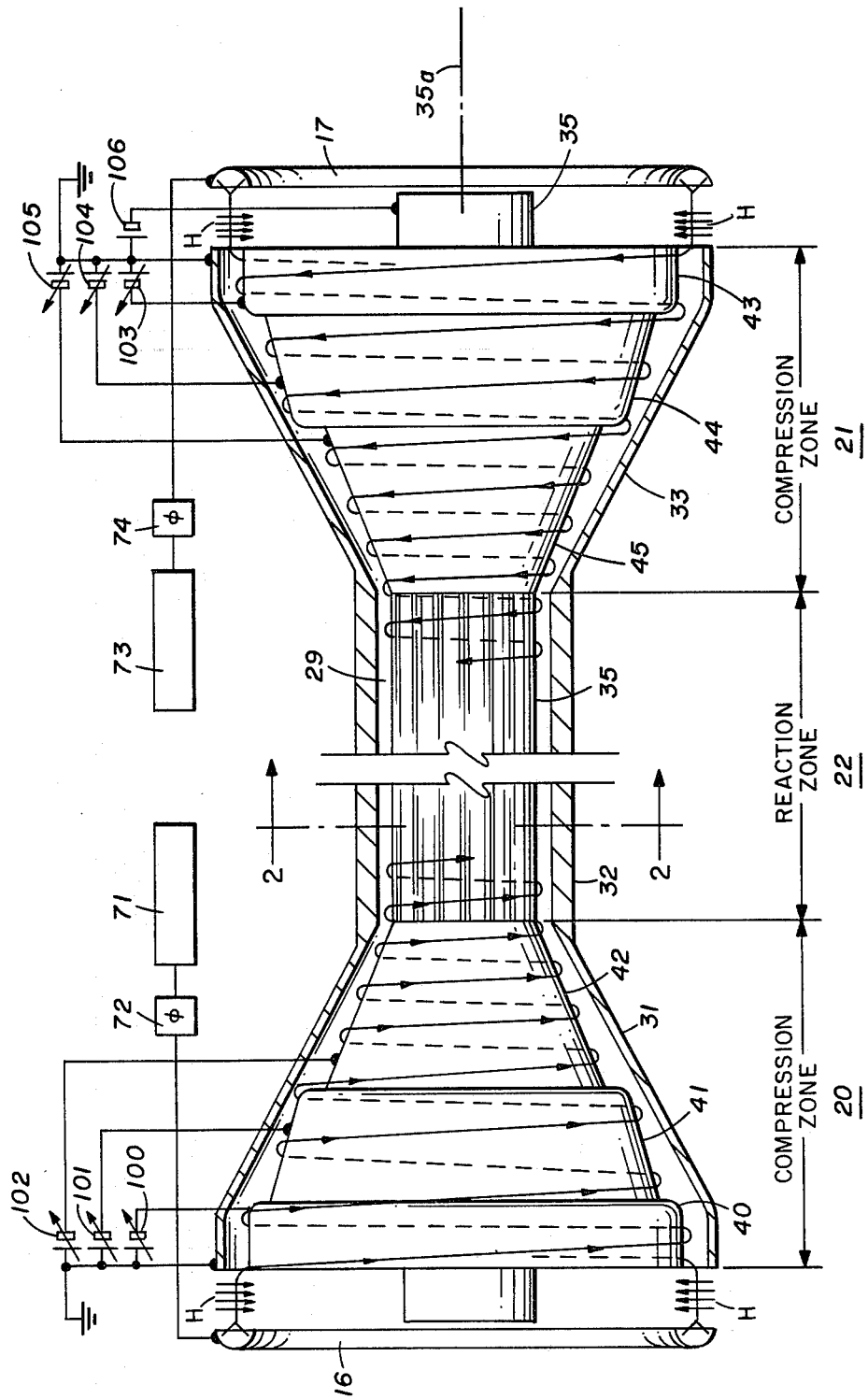
FIG. 1 is a longitudinal sectional view of a reactor in which the invention is employed.

As described in U.S. application Ser. No. 201,544, FIG. 1 comprises two ion sources 16 and 17 which face each other. Ion beams from sources 16 and 17 are accelerated parallel to a common reaction zone axis 35a. The beams each pass through a radial magnetic fields H. The magnetic fields force the ions into spiral paths about axis 35a. Ions from source 16 travel in one direction along spiral paths and ions from source 17 travel in the other direction along spiral paths. The beams are subjected to electrostatic fields which cause progressive decrease in the radii of the spiral paths and thus cause compression of the beams. More particularly, housing 31, 32, 33 is at a reference potential. Conical electrode 40 is at a negative potential as provided by DC source 100. Conical electrode 41 is at a negative potential as provided by DC source 101. Conical electrode 42 is at a negative potential as provided by DC source 102. Similarly, the potentials on electrodes 43–45 and on a cylinder 35 are established from sources 103–106, respectively. After compression, the beams enter an annular reaction chamber 29 in which ions in the beam from source 16 travel along helical paths in collision courses with respect to ions in the beam from source 17.

If the ions from source 16 are deuterium ions and ions from the source 16 are helium 3 ions, then the following well known reaction may take place:

$$^2D + {}^3He \rightarrow {}^4He + p + 18.3 \text{ MeV} \qquad (1)$$

Two particles result, i.e., a helium atom and a proton, plus 18.3 MeV of energy. The particles at such energy no longer are confined by the field and, thus, may escape to impinge the chamber wall. The energy is then absorbed at the boundaries of the reaction chamber 29. Heat may then be extracted through use of suitable heat exchangers not shown.

A problem in such systems is to establish beams of energetic ions of sufficient concentration that fusion producing collisions take place adequate to produce a positive net power gain from the system. To this end, the electric fields applied in the compression zones 20 and 21, FIG. 1, are such as to force the ions into very thin highly compressed dense beams which travel helical paths at a predetermined pitch or grade in chamber 29. Each ion in each beam will make a plurality of orbits as it traverses reaction zone 22. Collisions will then result in fusion of colliding particles.

It is noted at this point that the spaces in which the ions are generated, compressed and reacted are evacuated. The electric fields in compression zone 20 and compression zone 21 are so tailored as to cause the two beams to follow the same helical paths through the reaction chamber 29 at the same radius. The paths shown in FIG. 1 have been shown as having a very coarse pitch. It is to be understood that this is solely for the purpose of illustration. In actual practice the pitch would be such that in the reaction chamber 29, there would be many orbits of an ion in one beam as it passes through the other beam at the same radius.

The electric fields between the housing 31, 32, 33 and the various electrodes are tailored in compression zones 20 and 21 to provide a gradual decrease in the diameter of spiral paths along which the beams travel from sources 16 and 17 to the points where they enter the reaction chamber 29. More or fewer discrete compression fields may be imposed on the ion beam. The specific configuration will depend upon particular design desired.

The present invention provides for control of the ion concentration, as will now be described.

FIG. 2

Figure 2:
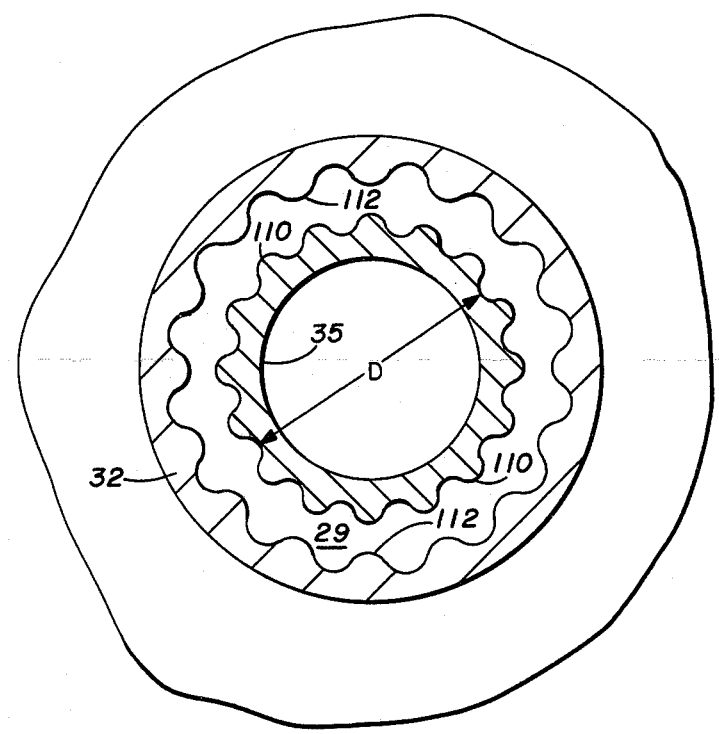
FIG. 2 is a sectional view of a portion of the reactor of FIG. 1 taken along lines 2—2 of FIG. 1.

In accordance with the present invention, the walls of the reaction chamber 29 are so shaped as to provide for strong focusing of the two ion beams as they orbit in opposite directions through reaction zone 29. In FIG. 2, where by way of example the diameter of the inner cylinder 35 is of the order of 10 cm, the outer surface of cylinder 35 is grooved or splined with longitudinal splines 110 extending into the reaction chamber 29. In a similar manner, the inner wall of the housing 32 is grooved to form splines 112.

While in the example illustrated about 20 such splines are formed on each of the cylinder 35 and the housing 32, it is preferred that for a 10 cm inner cylinder 35 about 45 to 55 splines would be formed on the surface of the cylinder 35 and a similar number formed on the inner wall of the housing 32. With the electric field as from source 102, FIG. 1, effective across the reaction zone, the streams of ions orbiting in the reaction chamber 29 will become concentrated as they pass through the high field existing between confronting splines 110 and 112. They will be of lesser concentration as they pass beyond the zones at which the reaction zone is narrowed by the spline configuration. In such a system where from 45 to 55 splines 110 and 112 are employed, the spline height would be about 0.6 cm. The length L of the reaction zone would then be about 16/n meters, where n equals strong focusing index. The value of n may be of the order of from 50 to 200 by the structure utilized herein.

The confinement time then becomes important. If the density is of the order of $$\phi\eta = 3.3 \times 10^{14}$$

then the distance between ions is:

$$\Delta \approx \left(\frac{1}{3.3 \times 10^{14}}\right)^{\frac{1}{3}} = 3^{\frac{1}{3}}\, 10^{-5} \approx 1.4 \times 10^{-5}\text{ cm}.$$

This is 1/7 of a micron, corresponding to a helical pitch $p = 7 \times 10^4$ per cm. Since L = 16 meters, the natural dwell time $\zeta$ is of the order of $$\zeta = \frac{2\pi R L p}{5 \times 10^8} = 14\text{ seconds}$$

where the diameter D of the helix is 10 cm. The above relation assumes an axial compaction of ions as well as radial compaction. Strong focusing is applied both radially and axially and both for magnetic and electric fields.

Fusion reaction rates are proportional to $n^2$ and their effect will compensate the smaller volumes where concentrations occur.

It is assumed that there is compensation for the small volumes by achieving large values of density n. If the strong focusing index is n, then $\eta \to n^2 \eta$, $V \to V/n^2$ so $\tau$ will be substantially unaffected. If this is assumed to be so, charge density may be:

$$(\phi\eta) = 3.3 \times 10^{14} \times 14 \approx 5 \times 10^{15}/\text{cc}.$$

This concentration number is well within the ignition region.

The total charge during operation is:

$$Q = \eta \times Ve = 3.3 \times 10^{14} \times 1200 = 4 \times 10^{17} = 0.066$$

coulomb.

The electric field gradient $E_f = 2 \times 10^6$ Volt/cm, and Q = 0.066 coulomb are rather large quantities to contend with. On the other hand, the cylinder 35 is 16 meters long.

The strong focusing arrangement is an electrical analog of known alternating gradient syncrotrons.

The splines 110 and 112 play the role of focusing and defocusing lenses, $f' = -f$ where $1/F = d/f_2$ in which F is the strong focusing focal length, $d \sim 0.3$ cm, the distance between two lens sections. By use of this device, there is achieved (by properly shaping the splines) focusing action many times greater than the restoring force provided by the radial gradient acceleration. This number is multiplied by the focusing index n = 50 to 200.

FIG. 3

Figure 3:
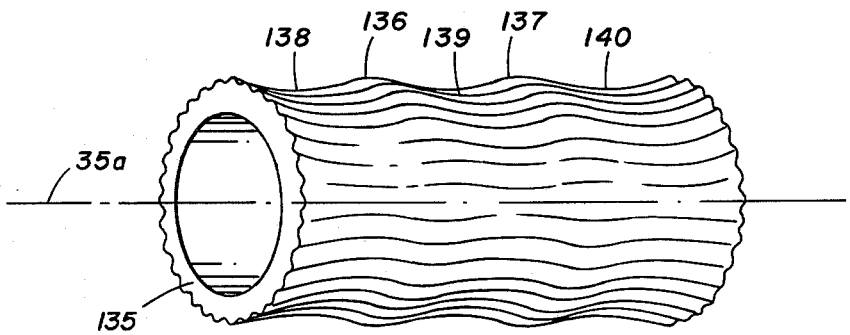
FIG. 3 is a view of a portion of the inner element defining part of the reaction zone of FIG. 1 in which compound dimensional variations are provided.

As above noted, strong focusing in both radial and axial deviations may be employed. In FIG. 3 corrugations are applied to the axial direction. As shown in FIG. 3 the cylinder 135, like cylinder 35 of FIGS. 1 and 2, is longitudinally splined. In addition the surface of the cylinder 135 is circularly ribbed. More particularly, portions 136 and 137 are of greater diameter than portions 138, 139 and 140. Such arrangements give axial focusing. It is possible to spiral, shape them hyperbolically, twist, etc., for special purposes. For the present purpose, the longitudinal splines 110 and 112 of FIGS. 1 and 2 parallel axis 35a. Circular rib portions 136 and 137, FIG. 3, are oriented normal to axis 35a.

The velocities $V_1$ and $V_2$ of the two ion beams are so fixed that they are proper for the desired radius in view of their mass. The mass of deuterium, D is $3.4 \times 10^{-24}$ gram, and tritium, T is $4 \times 10^{-24}$ gram. Their velocities will be $\sim 5.4 \times 10^8$ and $4.4 \times 10^8$ and their angular velocities proportional $\omega_1/\omega_2 \approx 11/g$. If there are 50 splines, the control frequencies $\Omega_1$ and $\Omega_2$ will be:

$$\Omega_1 = \omega/g_2 = 50\omega_2 \approx 2.7 \times 10^{19}\text{ Hz};$$

$$\Omega_2 \approx 2.25 \times 10^{19}\text{ Hz}.$$

The above frequencies $\Omega_1$ and $\Omega_2$ correspond to 11 and 9 cm microwaves. With the two frequencies as phase launchers, the maximum concentration areas will be brought into synchronization to maximize the fusion events.

Thus far described, strong focusing in either or both radial and axial dimensions may be employed to enhance the ion density at the points in the reaction chamber of highest field intensity. The electric field is greatest where there is relatively short spacing between the confronting crowns of the inner splines and outer splines in the walls of the reaction chamber.

It is to be understood that further focusing can be achieved in accordance with the present invention, namely in the tangential direction. More particularly, it is well known that if two waves travel through the same space in opposite directions, standing waves are produced. That is, there will be spots of high density. Thus, in accordance with the present invention, tangential focusing is achieved by modulating the grids on the ion sources 16 and 17, FIG. 1. This causes standing wave bunches to occur at velocity nodes in the reaction chamber. More particularly, a modulating source 71 is employed to provide an accelerating voltage of selectable frequency to the source 16 by way of the phase adjustment unit 72. In a similar manner, a selectable frequency source 73 applies a variable accelerating voltage of selected frequency to ion source 17 by way of phase adjustment unit 74. The velocity nodes can be caused to occur at the points of high ion density produced due to the presence of the spline-like structures in the reaction zone. This is done by adjusting the frequencies of the sources 71 and 73 to cause the velocity nodes to occur at the desired spacing tantentially. Since $f\lambda = v$, if the ions differ in mass then the frequencies (f) fron sources 71 and 73 will have to differ in order for wave length $\lambda$ to be the same for the beams from both sources 16 and 17. The phase units 72 and 74 are adjusted to cause the velocity nodes to occur at the points of minimum spacing between the inner wall and the outer wall of the reaction zone 29. Thus, modulating the ion sources to produce standing waves in the tangential direction further enhances the ion density for promotion of fusion reactions.

Having described an embodiment of the invention as illustrated in the accompanying drawings and described in the foregoing detailed description, it will be understood that the invention is not limited to the embodiment disclosed, but is capable of numerous rearrangements, modifications and substitutions without departing from the scope of the invention.

I claim:

1. In a fusion reaction system where ions from two sources are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, the improvement comprising:
   (a) establishing a beam of gaseous ions from each said source;
   (b) applying magnetic fields to direct opposite travel of said ions in said beams toward said orbital paths;
   (c) establishing a D.C. radially directed electrostatic field between said electrodes for confining said ion beams to said orbital paths free of negatively charged particles wherein said D.C. field is applied as the confining field free of any applied magnetic confining field;
   (d) injecting each of said two oppositely directed ion beams into said zone; and
   (e) bunching said ions along said paths to establish a plurality of concentrations of said ions located at spaced points along said paths with said points being the same for ions from both said sources, said plurality of concentrations comprising a plurality of alternating regions of high and low concentrations corresponding to regions of high and low electric fields.

2. The method of claim 1 in which said concentrations are caused to occur at regularly spaced points along said paths.

3. In a fusion reaction system where ions from two sources are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, the improvement comprising:
   (a) establishing a beam of gaseous ions from each said source;
   (b) applying magnetic fields to direct opposite travel of said ions in said beams toward said orbital paths;
   (c) establishing a D.C. radially directed electrostatic field between said electrodes for confining said ion beams to said orbital paths free of negatively charged particles wherein said D.C. field is applied as the confining field free of any applied magnetic confining field;
   (d) injecting each of said two oppositely directed ion beams into said zone; and
   (e) subjecting said ions to varying radial electrical fields along said paths to establish localized concentrations of said ions as they pass through points of high electric fields, said plurality of concentrations comprising a plurality of alternating regions of high and low concentrations corresponding to regions of high and low electric fields.

4. The method according to claim 1 which includes modulating the velocity of ions from said sources for producing standing waves along said paths with velocity nodes located at points in said zone where said localized concentrations of ions occur to further enhance the ion concentration at the velocity nodes of said standing waves.

5. The method according to claim 1 wherein said ions are tangentially bunched for further concentration of said ions where said localized concentrations occur.

6. In a fusion reaction system where ions from two sources are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, the improvement comprising:
   (a) means for establishing a beam of gaseous ions from each said source;
   (b) means for applying magnetic fields to direct opposite travel of said ions in said beams toward said orbital paths;

(c) means for establishing a D.C. radially directed electrostatic field between said electrodes for confining said ion beams to said orbital paths free of negatively charged particles wherein said D.C. field is applied as the confining field free of any applied magnetic confining field;

(d) means for injecting each of said two oppositely directed ion beams into said zone; and (e) structure arranged for establishing local variations in said radial electric fields to produce localized concentrations of said ions as they traverse said paths, said plurality of concentrations comprising a plurality of alternating regions of high and low concentrations corresponding to regions of high and low electric fields.

7. The combination set forth in claim 6 wherein means are provided to velocity modulate said sources for producing standing waves along said paths having velocity nodes located at points in said zone where said localized concentrations occur.

8. The combination set forth in claim 6 wherein means are provided to modulate the velocities said ions for producing standing waves along said paths having velocity nodes located at points in said zone where said localized concentrations occur.

9. The combination set forth in claim 6 wherein said structure includes variable voltage sources connected to modulate the velocities of ions from said two sources for producing standing waves in said zone having velocity nodes spaced the same as the spacing between said localized concentrations and phase adjustment means for positioning said velocity nodes at the same points as the points at which said localized concentrations occur.

10. In a fusion reaction system where ions from two sources are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, the improvement comprising:

(a) means for establishing a beam of gaseous ions from each said source;

(b) means for applying magnetic fields to direct opposite travel of said ions in said beams toward said orbital paths;

(c) means for establishing a D.C. radially directed electrostatic field between said electrodes for confining said ion beams to said orbital paths free of negatively charged particles wherein said D.C. field is applied as the confining field free of any applied magnetic confining field;

(d) means for injecting each of said two oppositely directed ion beams into said zone; and (e) electrically conductive spline structures arranged in at least one of the inner boundaries of said zone and the outer boundary of said zone for establishing local variations in said radial electric fields to produce localized concentrations of said ions as they pass by said spline structures, said plurality of concentrations comprising a plurality of alternating regions of high and low concentrations corresponding to regions of high and low electric fields.

11. In a fusion reaction system where ions are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, and where magnetic fields are applied to beams of said ions from each of two sources to direct opposite travel to said ions in said beams toward said orbital paths and where a D.C. radially directed electrostatic field is established between said electrodes for confining said ion beams to said orbital paths free of negatively charged particles wherein said D.C. field is applied as the confining field free of any applied magnetic confining field with each of said two oppositely directed ion beams injected into said zone, the improvement comprising:

bunching said ions along said paths to establish a plurality of concentrations of said ions located at spaced points along said paths with said points being the same for ions from both said sources, said plurality of concentrations comprising a plurality of alternating regions of high and low concentrations corresponding to regions of high and low electric fields.

12. The method of claim 11 in which said concentrations are caused to occur at regularly spaced points along said paths.

13. In a fusion reaction system where ions are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, and where a beam of gaseous ions is established from each of two sources to which magnetic fields are applied to direct opposite travel of said ions in said beams toward said orbital paths and where a D.C. radially directed electrostatic field is established between said electrodes for confining said ion beams to said orbital paths free of negatively charged particles wherein said D.C. field is applied as the confining field free of any applied magnetic confining field with each of said two oppositely directed ion beams injected into said zone, the improvement comprising:

subjecting said ions to varying radial electrical fields along said paths to establish localized concentrations of said ions as they pass through points of high electric fields, said plurality of concentrations comprising a plurality of alternating regions of high and low concentrations corresponding to regions of high and low electric fields.

14. The method according to claim 11 which includes modulating the velocity of ions from said sources for producing standing waves along said helical paths with velocity nodes located at points in said zone where said localized concentrations of ions occur to further enhance the ion concentration at the velocity nodes of said standing waves.

15. The method according to claim 11 wherein said ions are tangentially bunched for further concentration of said ions where said localized concentrations occur.

16. In a fusion reaction system where ions are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam, and where a beam of gaseous ions is established from each of two sources and to which magnetic fields are applied to direct opposite travel of said ions in said beams toward said orbital paths and where a D.C. radially directed electrostatic field is established between said electrodes for confining said ion beams to said orbital paths free of negatively charged particles wherein said D.C. field is applied as the confining field free of any applied magnetic confining field with each of said two oppositely directed ion beams injected into said zone, the improvement comprising:

structure arranged for establishing local variations in said radial electric fields to produce localized concentrations of said ions as they traverse said paths, said plurality of concentrations comprising a plurality of alternating regions of high and low concentrations corresponding to regions of high and low electric fields.

17. The combination set forth in claim 16 wherein means are provided to velocity modulate said sources for producing standing waves along said paths having velocity nodes located at points in said zone where said localized concentrations occur.

18. The combination set forth in claim 16 wherein means are provided to modulate the velocities said ions for producing standing waves along said paths having velocity nodes located at points in said zone where said localized concentrations occur.

19. The combination set forth in claim 16 wherein said structure includes variable voltage sources connected to modulate the velocities of ions from said two sources for producing standing waves in said zone having velocity nodes spaced the same as the spacing between said localized concentrations and phase adjustment means for positioning said velocity nodes at the same points as the points at which said localized concentrations occur.

20. In a fusion reaction system where ions are to rotate about a common axis in opposite senses in orbital paths of common radii in an annular reaction zone of substantially circular symmetry at any given cross-section perpendicular to the axis of said paths and bounded by spaced apart outer and inner coaxial electrode walls for promoting collisions of ions in one beam with ions in the other beam where means are provided for establishing a beam of gaseous ions from each of two sources to which magnetic fields are applied to direct opposite travel of said ions in said beams toward said orbital paths where means are provided for establishing a D.C. radially directed electrostatic field between said electrodes for confining said ion beams to said orbital paths free of negatively charged particles wherein said D.C. field is applied as the confining field free of any applied magnetic confining field with means for injecting each of said two oppositely directed ion beams into said zone, the combination therewith which comprises:

electrically conductive spline structures arranged in at least one of the inner boundaries of said zone and the outer boundary of said zone for establishing local variations in said radial electric fields to produce localized concentrations of said ions as they pass by said spline structures, said plurality of concentrations comprising a plurality of alternating regions of high and low concentrations corresponding to regions of high and low electric fields.

* * * * *

UNITED STATES PATENT AND TRADEMARK OFFICE
CERTIFICATE OF CORRECTION

PATENT NO. : 4,390,495
DATED : June 28, 1983
INVENTOR(S) : Winfield W. Salisbury It is certified that error appears in the above-identified patent and that said Letters Patent is hereby corrected as shown below:

Column 1, line 15, "steams" should read -- streams --.

Signed and Sealed this

Fifth Day of June 1984

[SEAL]

Attest:

GERALD J. MOSSINGHOFF

Attesting Officer          Commissioner of Patents and Trademarks